(12) United States Patent
Stamatakis et al.

(10) Patent No.: US 10,187,768 B2
(45) Date of Patent: Jan. 22, 2019

(54) SYSTEM, METHOD AND APPARATUS FOR SYSTEM STATUS IDENTIFICATION IN A WIRELESS SENSOR NETWORK

(71) Applicant: Senseware, Inc., McLean, VA (US)

(72) Inventors: Julien G. Stamatakis, Centreville, VA (US); Serene Al-Momen, Centreville, VA (US)

(73) Assignee: Senseware, Inc., Vienna, VA (US)

( * ) Notice: Subject to any disclaimer, the term of this patent is extended or adjusted under 35 U.S.C. 154(b) by 0 days.

(21) Appl. No.: 15/388,056

(22) Filed: Dec. 22, 2016

(65) Prior Publication Data

US 2017/0105057 A1 Apr. 13, 2017

Related U.S. Application Data

(63) Continuation of application No. 14/710,711, filed on May 13, 2015, now Pat. No. 9,538,578.
(Continued)

(51) Int. Cl.
*H04Q 9/00* (2006.01)
*H04W 4/70* (2018.01)
*G01D 4/00* (2006.01)
*H04W 84/18* (2009.01)
*H04W 4/80* (2018.01)
(Continued)

(52) U.S. Cl.
CPC .......... *H04W 4/70* (2018.02); *B60H 1/00842* (2013.01); *F24F 11/30* (2018.01); *G01D 4/002* (2013.01); *G01D 4/006* (2013.01); *G06F 3/0482* (2013.01); *G06F 3/04842* (2013.01); *G08C 19/00* (2013.01); *H04L 41/04* (2013.01); *H04L 41/0809* (2013.01); *H04L 43/10* (2013.01); *H04L 67/10* (2013.01); *H04Q 9/00* (2013.01); *H04W 4/38* (2018.02); *H04W 4/80* (2018.02); *H04W 24/02* (2013.01); *H04W 84/18* (2013.01); *B60H 1/00735* (2013.01); *F24F 11/0001* (2013.01); *F24F 2110/00* (2018.01); *G01D 4/004* (2013.01); *G08B 19/00* (2013.01); *H04Q 2209/10* (2013.01); *H04Q 2209/43* (2013.01); *H04Q 2209/80* (2013.01); *H04W 88/16* (2013.01); *H04W 92/06* (2013.01)

(58) Field of Classification Search
None
See application file for complete search history.

(56) References Cited

U.S. PATENT DOCUMENTS 6,584,113 B1 6/2003 Manduley
7,142,107 B2 11/2006 Kates
(Continued)

OTHER PUBLICATIONS

First Action Interview Pilot Program Pre-Interview Communication, U.S. Appl. No. 14/862,280, dated Mar. 8, 2017.
(Continued)

*Primary Examiner* — Leon Viet Q Nguyen

(57) ABSTRACT

A configured mode of operation of a wireless sensor network can be established through a dynamic remote configuration process. The plug-and-play universal sensor interface enables the monitoring capabilities of the wireless sensor network to scale seamlessly with the dynamic nature of changing sensor application objectives. A system status module enables a user to view the sensor service to confirm the current configuration of the wireless sensor network.

20 Claims, 11 Drawing Sheets

Related U.S. Application Data

(60) Provisional application No. 61/992,307, filed on May 13, 2014, provisional application No. 62/136,959, filed on Mar. 23, 2015.

(51) Int. Cl.

| | | |
|---|---|---|
| *G06F 3/0482* | (2013.01) | |
| *G06F 3/0484* | (2013.01) | |
| *G08C 19/00* | (2006.01) | |
| *H04L 12/24* | (2006.01) | |
| *H04W 24/02* | (2009.01) | |
| *H04L 12/26* | (2006.01) | |
| *H04L 29/08* | (2006.01) | |
| *H04W 4/38* | (2018.01) | |
| *F24F 11/30* | (2018.01) | |
| *B60H 1/00* | (2006.01) | |
| *G08B 19/00* | (2006.01) | |
| *H04W 92/06* | (2009.01) | |
| *H04W 88/16* | (2009.01) | |
| *F24F 110/00* | (2018.01) | |
| *F24F 11/00* | (2018.01) | |

(56) References Cited

U.S. PATENT DOCUMENTS

| | | | |
|---|---|---|---|
| 7,379,981 B2 | 5/2008 | Elliott et al. | |
| 8,051,489 B1 | 11/2011 | Montenegro | |
| 8,103,389 B2 | 1/2012 | Golden et al. | |
| 8,193,929 B1* | 6/2012 | Siu | H04L 12/2829 340/538 |
| 8,339,069 B2 | 12/2012 | Chemel | |
| 8,527,096 B2 | 9/2013 | Pavlak | |
| 8,548,630 B2 | 10/2013 | Grohman | |
| 8,855,825 B2 | 10/2014 | Grohman | |
| 8,892,797 B2 | 11/2014 | Grohman | |
| 9,534,929 B1 | 1/2017 | Stamatakis et al. | |
| 9,534,930 B1 | 1/2017 | Stamatakis | |
| 9,538,578 B1 | 1/2017 | Stamatakis et al. | |
| 9,551,594 B1 | 1/2017 | Stamatakis | |
| 9,554,236 B1 | 1/2017 | Stamatakis | |
| 2002/0173704 A1 | 11/2002 | Schulze | |
| 2005/0054289 A1 | 3/2005 | Salazar | |
| 2006/0059224 A1 | 3/2006 | Yao | |
| 2007/0103324 A1 | 5/2007 | Kosuge et al. | |
| 2007/0211681 A1 | 9/2007 | Sun et al. | |
| 2008/0195584 A1 | 8/2008 | Nath | |
| 2008/0240105 A1 | 10/2008 | Abdallah | |
| 2008/0316048 A1 | 12/2008 | Abdallah | |
| 2009/0033513 A1 | 2/2009 | Salsbury | |
| 2011/0034120 A1 | 2/2011 | Jaiyeola | |
| 2011/0040809 A1 | 2/2011 | Spanier | |
| 2011/0131320 A1 | 6/2011 | Hong | |
| 2011/0197064 A1 | 8/2011 | Garcia Morchon | |
| 2011/0276738 A1 | 11/2011 | Kim | |
| 2012/0098446 A1 | 4/2012 | Kim | |
| 2012/0155326 A1 | 6/2012 | Park et al. | |
| 2012/0161940 A1* | 6/2012 | Taylor | G01D 21/00 340/10.3 |
| 2012/0311413 A1 | 12/2012 | Pelletier | |
| 2013/0086245 A1 | 4/2013 | Lu et al. | |
| 2013/0246005 A1 | 9/2013 | Warren | |
| 2014/0126581 A1 | 5/2014 | Wang | |
| 2014/0293993 A1 | 10/2014 | Ryhorchuk | |
| 2014/0334653 A1 | 11/2014 | Luna | |
| 2014/0337256 A1 | 11/2014 | Varadi | |
| 2014/0359133 A1 | 12/2014 | Tian | |
| 2015/0021988 A1 | 1/2015 | Barnetson | |
| 2015/0029022 A1 | 1/2015 | Stebbins | |
| 2015/0316945 A1 | 11/2015 | Soya | |
| 2015/0364027 A1 | 12/2015 | Haupt et al. | |
| 2016/0006264 A1 | 1/2016 | Alperin | |
| 2016/0112518 A1 | 4/2016 | Haleem et al. | |
| 2016/0121487 A1 | 5/2016 | Mohan | |
| 2016/0241445 A1 | 8/2016 | Kim | |

OTHER PUBLICATIONS

Cloud Logger, 38 Zeros, 2015.
Smart Processing Starts at the Edge of the Network, B+B Smartworx, 2014.
Wireless Sensors and Output Devices, ConnectSense, 2015.
It's Time You Experienced Eclypse, Distech Controls, 2014.
Compact Sensor, Enlighted, 2015.
Energy Manager, Enlighted, 2015.
Gateway, Enlighted, 2015.
Enlighted Smart Sensor, 2015.
Manning, Lauren, "Wireless Infrastructure Provider Filament Closes $5m Series A, Shows Promise for Agtech Application," Aug. 21, 2015.
Intellastar, 2015.
Your Internet of Things, Monnit, 2014.
Monnit Industrial Wireless AC Current Meter, 2015.
$3^{rd}$ Generation Nest Learning Thermostat, 2015.
AcquiSuite+ Dtaa Acquisition Server, Obvius, LLC, Installation and Operation Manual, Model A8814, Jan. 11, 2014.
Application Note: ModHopper Makes Submetering Easy, Obvius, LLC, Mar. 29, 2012.
ModHopper—Wireless Modbus/Pulse Transceiver, Obvius, LLC, Installation and Operation, Model R9120 (Rev C), Dec. 11, 2012.
Atmel Corporation, 8-bit AVR Microcontroller with Low Power 2.4GHz Transceiver for ZigBee and IEEE 802.15.4, 2014.
Application Note, Atmel AT06482: Real Color ZLL LED Light Bulb with ATmega256RFR2—Software User's Guide, 2013.
Application Note, AT06412: Real Color ZLL LED Light Bulb with ATmega256RFR2—Hardware User Guide, 2014.
Exploring New Lighting Opportunities with ZigBee Light Link Webinar, May 16, 2012.
Point Six Wireless Wi-Fi Sensor Product Guide, 2015.
Eagle, Rainforest Automation, 2015.
Product Comparison Guide, SmartStruxture Lite solution and wireless devices for SmartStruxture solution, Schneider Electric, Mar. 12, 2015.
SmartStruxure Lite Solution, SEC Series, Smart Terminal Controller (SEC-TE), Schneider Electric, Aug. 1, 2013.
SmartStruxure Lite Solution, Schneider Electric, May 1, 2015.
SmartStruxure Lite Solution, Our open system approach to standards and protocols, Schneider Electric, Jul. 2, 2014.
Senseware, Mar. 25, 2014.
Product Data Sheet, SWS-DPC Wireless Pulse Counters, SpinWave Systems, Inc., 2007.
Product Data Sheet, SWC-TSTAT-3 Wireless Thermostat Controller, SpinWave Systems, Inc., 2012.
A3 Wireless Sensor Network, SpinWave Systems, Inc., 2007.
Veris Industries, 2015.
U.S. Appl. No. 62/025,640, entitled "Separation of Current Sensor and Voltage Sensor for True Power Measurement," filed Jul. 17, 2014.
Khamphanchai et al., Conceptual Architecture of Building Energy Management Open Source Software (BEMOSS), 5th IEEE PES Intelligent Smart Grid Technologies (ISGT) European Conference, Oct. 12-15, 2014.
DOLPHIN Core Description, EnOcean, Jul. 21, 2014.
Remote Management 2.0, EnOcean, Mar. 6, 2013.
EnOcean—The World of Energy Harvesting Wireless Technology, Feb. 2015.
Wireless Sensor Solutions for Home & Building Automation—The Successful Standard Uses Energy Harvesting, EnOcean, Aug. 10, 2007.
Metasys® System Product Bulletin, Code No. LIT-1201526, Release 7.0, Dec. 5, 2014.
Metasys® System Extended Architecture Wireless Network, Application Note, Oct. 24, 2006.

(56) References Cited

OTHER PUBLICATIONS

Metasys® System Field Equipment Controllers and Related Products, Product Bulletin, Code No. LIT-12011042, Software Release 5.0, Jun. 21, 2010.
ZFR1800 Series Wireless Field Bus System, Technical Bulletin, Code No. LIT-12011295, Software Release 10.1, Dec. 5, 2014.
Wireless Metasys® System Product Bulletin, Code No. LIT-12011244, Software Release 5.0, Jan. 4, 2010.
Environmental Index™—Balancing Efficiency with Comfort, Automated Logic Corporation, 2013.
Equipment Portal, Automated Logic Corporation, 2013.
EnergyReports™ Web Application—A Tool for Sustainable Building Operations, Automated Logic Corporation, 2013.
WebCTRL®—Powerful and Intuitive Front End for Building Control, Mar. 26, 2015.
iSelect Adds New Portfolio Company: Bractlet, 2015.
Know—Bractlet.
Analyze—Bractlet.
Ensure—Bractlet.
Announcing Samsara: Internet connected sensors, May 18, 2015.
Samsara—Internet Connected Sensors.
Samsara—Features.
Samsara—Models.
Samsara—API.
Press Release, Helium Makes Sense of the Internet of Things, Oct. 27, 2015.
Press Release, Helium Introduces Another Smart Sensor for Environmental Monitoring, Apr. 25, 2016.
Press Release, Helium Announces Helium Pulse Monitoring and Alerting Application, Apr. 25, 2016.
EE Times, IoT Startup Revises 802.15.4 Nets, Oct. 27, 2015.
Helium Pulse™ for Monitoring and Alerting, 2016.
Helium Green™ Environmental Smart Sensor, 2016.
Helium Blue™ Temperature & Door Smart Sensor, 2016.
First Action Interview Pilot Program Pre-Interview Communication, U.S. Appl. No. 14/710,711, dated Jun. 16, 2016.
Office Action, U.S. Appl. No. 14/710,191, dated Jul. 20, 2016.
First Action Interview Pilot Program Pre-Interview Communication, U.S. Appl. No. 14/996,442, dated Dec. 6, 2017.
Office Action, U.S. Appl. No. 15/790,123, dated Jul. 25, 2018.

\* cited by examiner

SYSTEM, METHOD AND APPARATUS FOR SYSTEM STATUS IDENTIFICATION IN A WIRELESS SENSOR NETWORK

This application is a continuation of non-provisional patent application Ser. No. 14/710,711, filed May 13, 2015, which claims the benefit of and priority to provisional application No. 61/992,307, filed May 13, 2014, and to provisional application No. 62/136,959, filed Mar. 23, 2015. Each of the above-identified applications is incorporated herein by reference in its entirety.

BACKGROUND

Field

The present disclosure relates generally to sensor applications, including a system, method and apparatus for system status identification in a wireless sensor network.

Introduction

Sensors can be used to monitor physical or environmental conditions. Wireless sensor networks can be used to collect data from distributed sensors and to route the collected sensor data to a central location.

BRIEF DESCRIPTION OF THE DRAWINGS

In order to describe the manner in which the above-recited and other advantages and features can be obtained, a more particular description will be rendered by reference to specific embodiments thereof which are illustrated in the appended drawings. Understanding that these drawings depict only typical embodiments and are not therefore to be considered limiting of its scope, the disclosure describes and explains with additional specificity and detail through the use of the accompanying drawings in which.

DETAILED DESCRIPTION

Various embodiments are discussed in detail below. While specific implementations are discussed, it should be understood that this is done for illustration purposes only. A person skilled in the relevant art will recognize that other components and configurations may be used without parting from the spirit and scope of the present disclosure.

Sensors provide a mechanism for discovering and analyzing the state of physical or environmental conditions. Wireless sensor networks provide an efficient mechanism for connecting with and retrieving sensor data from a distributed set of sensors. The growing emphasis on the Internet of Things (IoT) has further reinforced the importance of wireless networks in connecting a range of devices. Notwithstanding today's emphasis on connecting a variety of devices using wireless communication, it is recognized in the present disclosure that the penetration of wireless sensor networks into the marketplace is limited due to the high level of installation and maintenance costs.

By their very nature, sensors are designed to measure a particular physical or environmental condition. Sensors therefore represent a class of application-specific devices. Every sensor network installation can be designed with unique cost constraints, measurement objectives, site restrictions, or other application-specific requirements that can influence sensor network design. These application-specific qualities lead to significant challenges in identifying a scalable solution that can be applied across various industries and markets. For example, it is recognized that a scalable solution should be flexible in accommodating new types of sensor applications with little redesign or redeployment of a wireless sensor network. Such a scalable solution would significantly reduce installation and maintenance costs as new sensors and application features are rolled out across an already deployed sensor network infrastructure. It is recognized that sensor network solutions should enable an evolution of the deployed wireless sensor network without wasting previously-deployed wireless sensor network elements or requiring significant time or expense in modifying the previously-deployed wireless sensor network.

Figure 1:
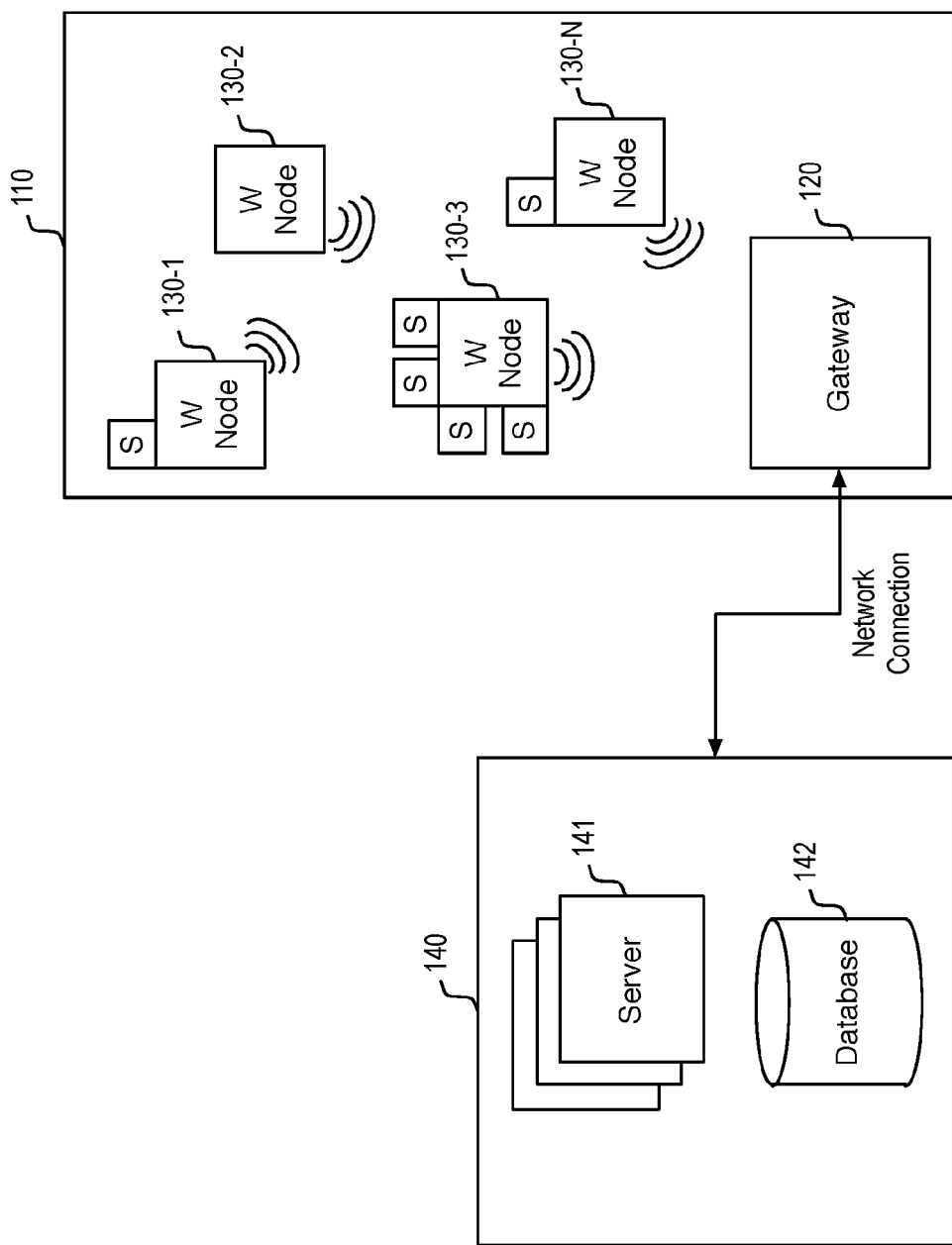
FIG. 1 illustrates an example embodiment of a wireless sensor network that can collect and distribute sensor information.

FIG. 1 illustrates an example embodiment of a wireless sensor network that can collect and distribute sensor information. The wireless sensor network can be configured to collect and distribute sensor information that is based on measurements by sensors deployed at monitored location 110. Monitored location 110 can represent any area where a collection of sensors is deployed. Monitored location 110 may or may not represent a physical area having clearly defined boundaries. As would be appreciated, the extent of the monitoring application itself provides a sense of boundary to monitored location 110. In one example, monitored location 110 can represent a building such as a home, hotel, school, community building, stadium, convention center, warehouse, office building, multi-dwelling unit, or other defined building structure. In another example, monitored location 110 can represent an area of control such as a monitored area that can be fixed or movable.

Disposed within monitored location 110 is a plurality of sensors. Communication between the plurality of sensors and gateway device 120 is facilitated by a set of wireless nodes 130-$n$. In general, wireless nodes 130-$n$ can be configured to form a wireless mesh network. In one embodiment, the communication protocol between wireless nodes 130-$n$ is based on the IEEE 802.15.4 protocol. A wireless mesh network can be formed between wireless nodes 130-$n$ and can be used to facilitate communication between any wireless node 130-$n$ and gateway device 120.

A wireless node 130-$n$ can be configured to support one or more sensor module units (S), each of which can be individually coupled to a wireless node 130-$n$ via a plugand-play universal sensor interface. The plug-and-play universal sensor interface facilitates the separation of the wireless node communication infrastructure from the set of one or more sensor module units that are deployed at the location at which the supporting wireless node 130-*n* is installed. This separation creates significant flexibility in choice of sensors that may or may not be deployed proximate to the time of installation of the supporting wireless node 130-*n*. As such, the plug-and-play universal sensor interface enables a sensor network solution to respond to changes in the sensor application requirements at monitored location 110 without incurring significant redeployment costs.

This flexibility would not be available if sensors were integrated with a wireless node. When a wireless node is deployed with integrated sensors, the monitoring capability of the wireless node is limited to the sensors that were pre-installed in the wireless node. This pre-installation would fix the capability of the wireless node at the time of deployment and would limit the wireless node to a static sensor application objective. Thus, if a defective sensor needs to be replaced, or if another type of sensor needs to be added to meet a dynamic sensor application objective, then the wireless node would need to be replaced or otherwise modified. This would impact at least part of the wireless sensor network infrastructure, which can result in sensor network downtime at the monitored location. A further impact would be produced as the maintenance expense of such a replacement or modification would be prohibitive.

In the present disclosure, the plug-and-play universal sensor interface enables the sensor module units to be deployed separately from wireless nodes 130-*n*. The plug-and-play universal sensor interface allows any type of sensor module unit to be connected to any wireless node 130-*n* at any time and without any reconfiguration of the supporting wireless network infrastructure. This feature allows great flexibility in the deployment and modification of wireless sensor networks at a lower price point. Additionally, the plug-and-play universal sensor interface enables the monitoring capabilities of the wireless sensor network to scale seamlessly with the dynamic nature of changing sensor application objectives.

In one example, a wireless node 130-*n* can be configured to support four sensor module units. As would be appreciated, the particular number of sensor module units that can be supported by a wireless node 130-*n* can vary. Sensor module units can be added onto wireless nodes 130-*n* sequentially at different deployment times. Thus, for example, a first sensor module unit can be added at a time of installation of the wireless node 130-*n*, with one or more additional sensor module units added to the same wireless node 130-*n* in the future as needed to address changing sensor application objectives.

In one embodiment, each of the sensor module units can support a plurality of individual sensors. In one example, a sensor module unit can support a set of eight sensors. In this example, the set of eight sensors can include sensors of one or more types. For example, sensors in a sensor module unit can include one or more of the following: a temperature sensor, a humidity sensor, an air quality sensor (e.g., $CO_2$ sensor), a light sensor, a sound sensor, a contact sensor, a pulse sensor, a water sensor, or any other type of sensor configured to measure a characteristic of a part of monitored location 110. A sensor module unit can include multiple sensors of a single type. For example, a particular configuration of a sensor module unit can include four pulse sensors, one temperature sensor, one humidity sensor, one air quality sensor, and one light sensor. In another example, a particular configuration of a sensor module unit can include eight sensors of a single type. As would be appreciated, the set of sensors included within a particular sensor module unit can be chosen to meet a given sensor application objective.

In the present disclosure, it is recognized that sensor module units can be targeted or otherwise designed for a particular class of sensor applications. For example, one sensor module unit can be designed for sensor applications targeted to school buildings, while another sensor module unit can be designed for sensor applications targeted to office buildings. The sensor module unit targeted for school building use can include a set of sensors that are popular with school building sensor applications. For instance, the set of sensors can include pulse sensors for measuring utility consumption (e.g., gas, water, electricity), a temperature sensor, an air quality sensor, a humidity sensor and a light sensor. The sensor module unit targeted for school building use can then be selected for installation with wireless nodes deployed in school buildings. In this manner, a relatively generic sensor module unit can be deployed across many sensor application deployments in various schools without requiring full customization for a specific application at a particular school. Production costs of the sensor module units are thereby minimized without any loss of flexibility in deploying customized sensor module units.

The impact on economies of scale can be readily appreciated. Wireless node modules can be produced on a larger manufacturing scale because the generic wireless nodes can be applied in many types of monitored locations in a manner that is separate from the particular sensor objectives at the particular monitored location. Correspondingly, a limited number of types of sensor module units can be manufactured. For example, a first sensor module unit type can be produced for office building applications and can include a suite of sensors typically used in office buildings. Similarly, a second sensor module unit type can be produced for school building applications and can include a suite of sensors typically used in school buildings.

In the deployment at a particular monitored location, the generic wireless nodes can be installed at the particular monitoring points in the monitored location with the particular type of sensor module unit attached to the generic wireless node to meet the particular needs at that monitoring point. Customization of this nature is far superior to the limited options presented by integrated devices. Customization need not result in wireless sensor network downtime and can be effected through the selective coupling of particular sensor module units to wireless nodes.

A further benefit of this form of customization is that it obviates the need to re-qualify and test wireless nodes to meet a new sensor application. Qualification need only be performed on new sensor module units since the existing wireless network infrastructure provided by the generic wireless nodes had previously been qualified and tested. This reduces the time needed to bring new sensor network features to market in addressing new market opportunities. If, on the other hand, sensors were integrated with the wireless nodes, then the entire device would need to be re-qualified and tested before being brought to market. As described, the plug-and-play universal sensor interface enables sensor network application customization without increasing installation and maintenance costs of the sensor network infrastructure.

Returning to FIG. 1, wireless node 130-1 is illustrated as supporting a single sensor module unit (S). Wireless node 130-2, on the other hand, is illustrated as not supporting any sensor module units. This example illustrates a scenario where wireless node 130-2 has been specifically installed as a wireless relay node in a wireless mesh network to facilitate a connection between wireless node 130-1 and gateway 120. As further illustrated, wireless node 130-3 supports four different sensor module units (S). This example illustrates a scenario where the sensing needs of a particular part of monitored location 110 is greater and would therefore require additional installed sensors at the location of wireless node 130-3. For instance, wireless node 130-3 can be installed in a hub of sensing activity at monitored location 110, while wireless node 130-1 or wireless node 130-N can be installed in a periphery of sensing activity at monitored location 110. The plug-and-play universal sensor interface enables sensor module unit deployment to match sensor application needs in a manner that scales seamlessly with the deployed wireless network infrastructure. Deployment and maintenance costs are thereby contained.

The wireless mesh network created by wireless nodes 130-n facilitates communication between sensor module units and gateway 120 via the wireless network infrastructure established by wireless nodes 130-n. Gateway 120 can be installed at monitored location 110 and can be provided with network connectivity. For example, gateway 120 can be provided with a network connection that facilitates communication of sensor data to host system 140. The network connection can be embodied in various forms depending upon the particular characteristics of monitored location 110.

For example, where monitored location 110 is a building in a developed area, then the network connection can be facilitated by a wired Internet connection via an Internet service provider. In another example, where monitored location 110 represents a remote physical area (or movable area) that may or may not include a building structure, then the network connection can be facilitated by a terrestrial or satellite based wireless network. As would be appreciated, the principles of the present disclosure would not be dependent on the particular form of network connection supported by gateway 120 in communicating with host system 140.

The network connection between gateway 120 and host system 140 enables the collection of sensor data by host system 140. In one embodiment, host system 140 can be located in a location remote from gateway 120. In general, host system 140 can be configured to perform a collection of sensor data from monitored location 110, storage of sensor data in database 142, and a distribution of sensor data to one or more destinations. As illustrated, host system 140 can include one or more servers 141 that can facilitate the collection, storage and distribution processes.

Figure 2:
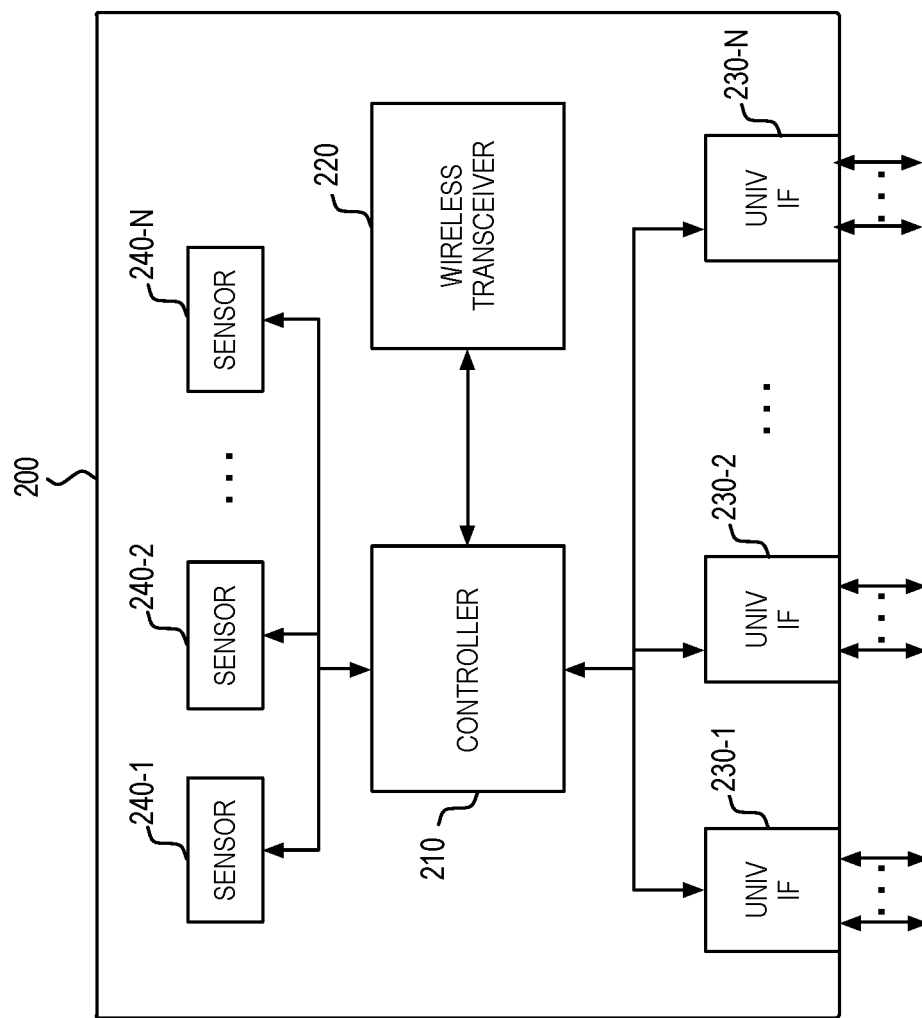
FIG. 2 illustrates an example embodiment of a wireless node.

As described, wireless nodes 130-n provide a wireless network infrastructure upon which sensor module units can be deployed for a customized sensor application. FIG. 2 illustrates an example embodiment of a wireless node. As illustrated, wireless node 200 includes controller 210 and wireless transceiver 220. In one embodiment, wireless node 200 can be powered via a battery source (not shown). In another embodiment, wireless node 200 can be powered via an external power source available at the point of installation at the monitored location.

Wireless transceiver 220 facilitates wireless communication between wireless node 200 and a gateway or another wireless node that operates as a relay between wireless node 200 and the gateway. The sensor data communicated by wireless transceiver 220 is collected by controller 210 via one or more universal sensor interfaces 230-n. Each universal sensor interface 230-n can support connection of wireless node 200 with a separate sensor module unit that can be attached to wireless node 200.

Universal sensor interfaces 230-n can represent a combination of hardware and software. The hardware portion of universal sensor interfaces 230-n can include a wired interface that enables communication of different signals between wireless node 200 and a connected sensor module unit. In one example, the wired interface can be enabled through a connector interface, which is exposed by the housing of the wireless node 200, and that is configured to receive a sensor module unit connector via removable, pluggable insertion.

In one embodiment, the wired interface can be based on a Serial Peripheral Interface (SPI) bus. In one example, the wired interface enables six connections: supply, ground, data in, data out, clock, and device select. The device select connection can be unique to each wired interface and can enable controller 210 in wireless node 200 to select the particular sensor module unit with which wireless node 200 desires to communicate. The software portion of the universal sensor interfaces 230-n can include a protocol that allows wireless node 200 to communicate with a sensor module unit.

In one example protocol, controller 210 can be configured to poll the various universal sensor interfaces 230-n to determine whether any sensor module units are connected. As part of this protocol, controller 210 can first request a sensor ID from a sensor module unit. If the response read is 0, then controller 210 would know that no sensor module unit is connected to that universal sensor interface 230-n. If, on the other hand, the response read is not 0, then controller 210 would ask for the number of data values that have to be retrieved and the number of bits on which the data values are coded. In one example, the higher order 8-bits of a 16-bit communication between controller 210 and a sensor module unit identifies the number of data values, while the lower order 8-bits of the 16-bit communication identifies the number of bits used to code each data value. Based on the number of data values to be retrieved, controller 210 would then collect that number of data values, wherein each value can represent a different sensor channel of the sensor module unit.

In one example, a wireless node can be configured for coupling to four different sensor module units. If each of the sensor module units can include up to eight sensors, then the wireless node can be configured to communicate 32 sensor channels of data to the gateway via wireless transceiver 220.

In the illustration of FIG. 2, wireless node 200 also includes one or more sensors 240-n. In one example, sensors 240-n can be contained within or otherwise supported by the housing of wireless node 200. In various scenarios, the one or more sensors 240-n can facilitate monitoring at that part of the monitored location, including the health and/or status of wireless node 200. In one example configuration, sensors 240-n can include a temperature sensor, a humidity sensor, a voltage sensor, a link quality sensor, or any other sensor that can be used to facilitate the sensing needs of wireless node 200.

As noted, wireless nodes can be designed as a generic communication node upon which customized sensing functionality can be added through the connection of particular sensor module units. In this framework, the wireless nodes can be constructed with base communication functionality that can operate independently of particular sensors. As such, the wireless nodes can provide a relatively stable wireless network infrastructure that can support multiple generations of sensor module units. As would be appreciated, the requirements of the sensor module units would be dependent on the particular sensing application. For example, a first sensor module unit can be designed with a first generation sensor having a first degree of accuracy, reliability, or other sensor characteristic, while a second sensor module unit can be designed with a second generation sensor of the same type having a second degree of accuracy, reliability, or other sensor characteristic. As this example illustrates, different generations of sensor module units can be attached to the same wireless node using the plug-and-play universal sensor interface. The original investment in the wireless node would not be lost should the second sensor module unit replace the originally-installed first sensor module unit. A low-cost evolutionary path of the wireless sensor network would therefore be enabled that could scale seamlessly with a customer's needs, sensor technology, or other factor that implicates a sensor module unit modification.

Figure 3:
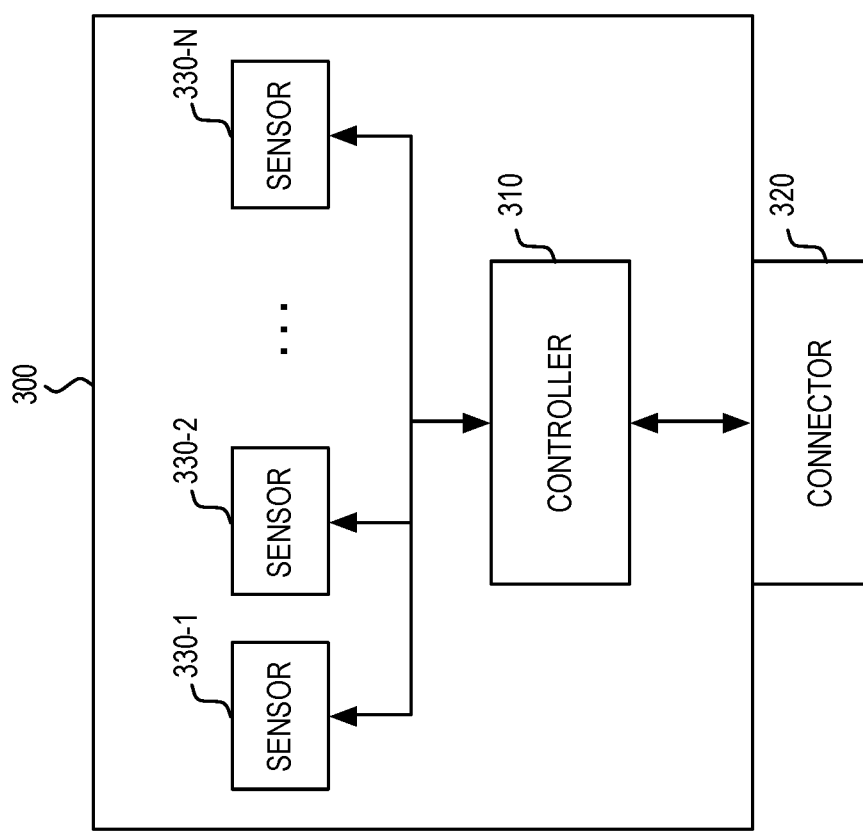
FIG. 3 illustrates an example embodiment of a sensor module unit.

FIG. 3 illustrates an example embodiment of a sensor module unit designed for attachment to a wireless node. As illustrated, sensor module unit 300 includes controller 310 that communicates over a universal sensor interface with the wireless node. In one embodiment, sensor module unit 300 supports a connector 320 configured for pluggable, removable insertion into a connector interface exposed by the wireless node. In another embodiment, the sensor module unit can be coupled to the connector interface exposed by the wireless node via a connector attached to a cable.

Sensor module unit 300 can include a plurality of sensors 330-$n$. In one example, sensor module unit 300 includes up to eight sensors of one or more types. In the present disclosure, it is recognized that a sensor module unit can be pre-populated with a suite of sensors targeted to a particular class of sensor applications. In this framework, a first suite of sensors can be used in a first sensor module unit targeted to a first sensor application (e.g., school buildings), while a second suite of sensors can be used in a second sensor module unit targeted to a second sensor application (e.g., office buildings) different from the first sensor application. Here, the underlying wireless network infrastructure can remain the same while particular sensor module units are chosen for coupling to one or more wireless nodes to facilitate a particular sensor application at a monitored location.

Figure 4:
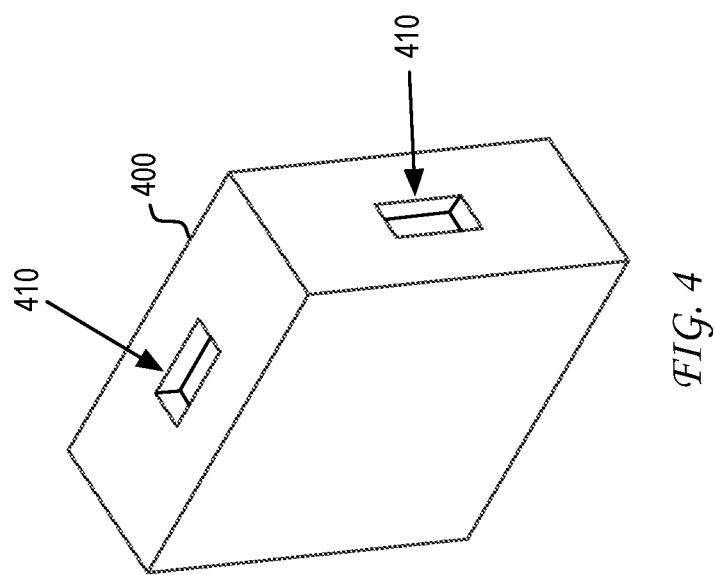
FIG. 4 illustrates an example embodiment of a housing of a wireless node that exposes connector interfaces.

The plug-and-play nature of the connection of sensor module units to supporting wireless nodes facilitates a modular framework of installation of a wireless sensor network. FIG. 4 illustrates an example embodiment of a housing of a wireless node that exposes a plurality of connector interfaces to produce the modular framework. As illustrated, wireless node 400 can have a housing configured to expose a plurality of connector interfaces 410. Each of the plurality of connector interfaces 410 can support the physical attachment of a single sensor module unit. In the example illustration, each side of the housing of wireless node 400 exposes a single connector interface 410. In the present disclosure, it is recognized that the housing of the wireless node can be substantially larger than the housing of the sensor module unit. This can result, for example, because the wireless node can be designed with additional components such as an internal power source (e.g., battery) that can involve additional volume requirements as compared to the sensor module units. It is therefore recognized that one embodiment of a wireless node can have multiple sensor module units physically attached to a single side of the wireless node.

Figure 5:
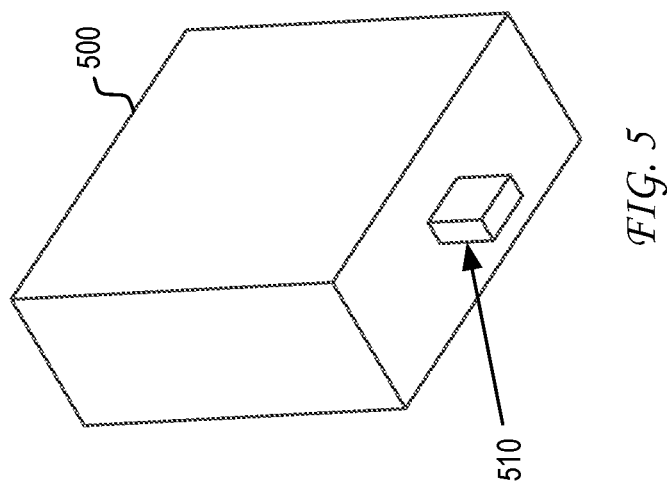
FIG. 5 illustrates an example embodiment of a housing of a sensor module unit.

FIG. 5 illustrates an example embodiment of a housing of a sensor module unit that enables the modular framework. As illustrated, sensor module unit 500 supports a connector 510 that can be configured for pluggable, removable insertion into a corresponding connector interface 410 exposed by the housing of wireless node 400. The connection of sensor module unit 500 to wireless node 400 via the insertion of connector 510 into connector interface 410 produces a true plug-and-play framework of wireless sensor network deployment.

Figure 6:
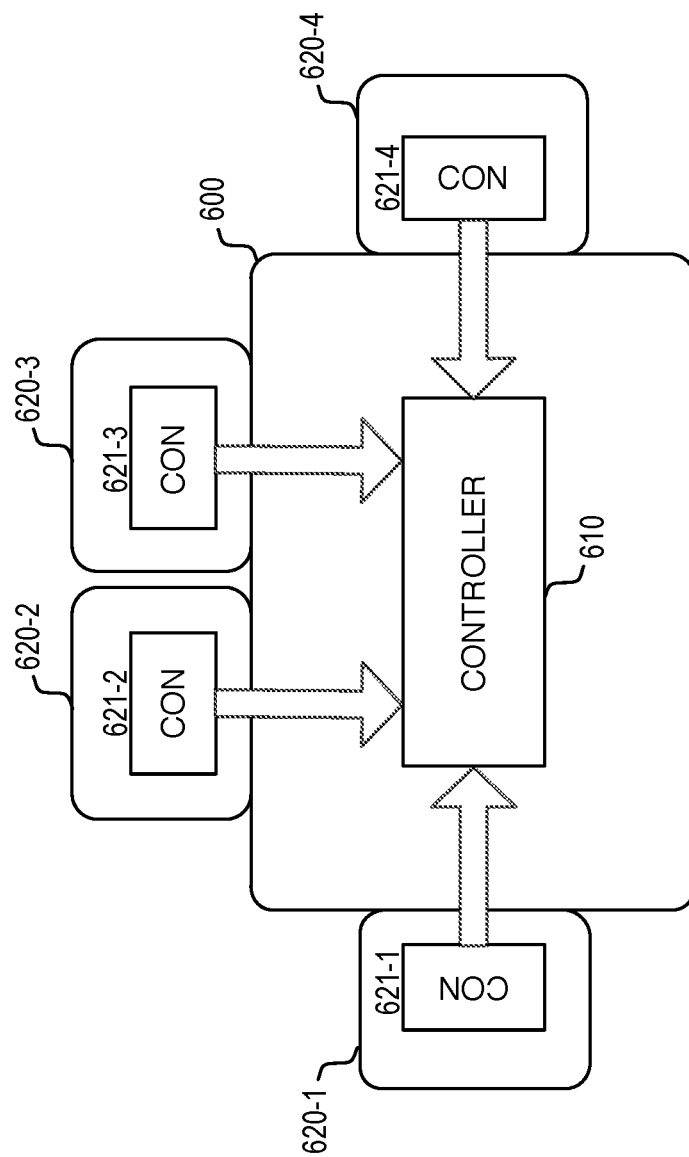
FIG. 6 illustrates an example embodiment of a wireless node that is physically attached to a plurality of sensor module units.

FIG. 6 illustrates an example embodiment of a wireless node that is physically attached to a plurality of sensor module units via universal sensor interfaces. As illustrated, wireless node 600 is attached to sensor module unit 620-1, sensor module unit 620-2, sensor module unit 620-3, and sensor module unit 620-4 via four connector interfaces exposed by the housing of wireless node 600. The attachment of sensor module unit 620-1 to wireless node 600 enables communication of sensor data between controller 621-1 and controller 610. The attachment of sensor module unit 620-2 to wireless node 600 enables communication of sensor data between controller 621-2 and controller 610. The attachment of sensor module unit 620-3 to wireless node 600 enables communication of sensor data between controller 621-3 and controller 610. Finally, the attachment of sensor module unit 620-4 to wireless node 600 enables communication of sensor data between controller 621-4 and controller 610. Each of sensor module units 620-1 to 620-4 can be coupled to wireless node 600 via a separate universal sensor interface having the connectivity characteristics described above.

Controller 610 in wireless node 600 can communicate with each of sensor module units 620-1 to 620-4 to retrieve sensor data generated by one or more sensors on the respective sensor module units 620-1 to 620-4. In one embodiment, the sensor channels of data that are communicated from sensor module unit 620-$n$ to wireless node 600 are configurable. As noted, communication between controller 610 and the sensor module units 620-1 to 620-4 can be based on a protocol that enables identification of the number of data values that are transmitted from each of sensor module units 620-1 to 620-4 to controller 610.

In one embodiment, a sensor module unit can be configured to transmit data from only a subset of the sensors on the sensor module unit. To illustrate this embodiment, consider again the example of a sensor module unit targeted for school building use. In this example, the sensor module unit can include a standard suite of eight sensors, including four pulse sensors for measuring utility consumption (e.g., gas, water, electricity), a temperature sensor, an air quality sensor, a humidity sensor and a light sensor. Individual sensors in this standard suite of sensors can be activated selectively such that only a subset of the sensor channels of data is forwarded from the sensor module unit to the wireless node.

Here, it is recognized that the selective transmission of sensor channels of data can be used to support efficient wireless bandwidth use or reduced power consumption within the wireless sensor network at the monitored location. Moreover, the selective transmission of sensor channels of data can support a billing model where customers pay per sensor channel stream of data that is exposed by the host system to the customer. Additionally, customization of a sensor module unit after installation enables remote customization, which thereby lowers the cost of installation and maintenance incurred by personnel responsible for configuring the wireless sensor network at the monitored location. As would be appreciated, this aspect of configuration can be designed to reduce the amount of pre-installation customization required in setting up sensor module unit 620-$n$ to operate with wireless node 600 at the monitored location.

Figure 7:
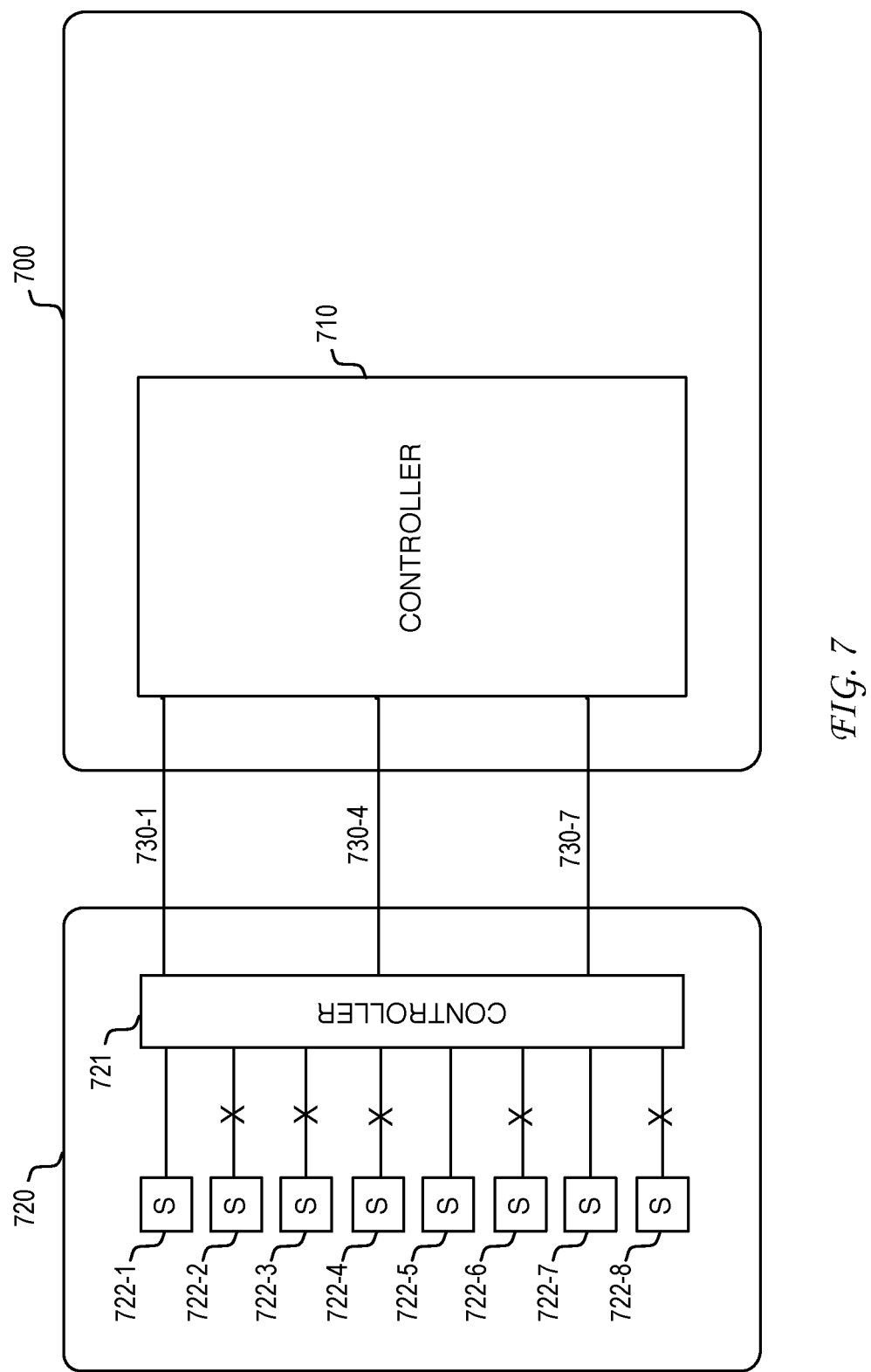
FIG. 7 illustrates an example embodiment of a configuration of a set of sensor channels between a wireless node and a sensor module unit.

FIG. 7 illustrates an example embodiment of the configuration of a set of sensor channels between a sensor module unit and a wireless node. As illustrated, wireless node 700 includes controller 710, while sensor module unit 720 includes controller 721. Controller 710 in wireless node 700 and controller 721 in sensor module unit 720 are configured to communicate using a universal sensor interface such as that described above.

In this example, assume that sensor module unit 720 includes eight sensors 722-1 to 722-8 (e.g., four pulse sensors for measuring utility consumption, one temperature sensor, one air quality sensor, one humidity sensor and one light sensor), which can represent a standard suite of sensors targeted for school building use. After sensor module unit 720 has been attached to wireless node 700 via a universal sensor interface, channels of data associated with a first subset of the suite of eight sensors 722-1 to 722-8 can be activated, while channels of data associated with a second subset of the suite of eight sensors 722-1 to 722-8 can be deactivated.

For example, assume that sensors 722-1 to 722-4 are pulse sensors, sensor 722-5 is a temperature sensor, sensor 722-6 is an air quality sensor, sensor 722-7 is a humidity sensor, and sensor 722-8 is a light sensor. As illustrated, sensor module unit 720 can be configured such that channels of data associated with a first subset of sensors, including pulse sensor 722-1, temperature sensor 722-5 and humidity sensor 722-7 are activated. Correspondingly, sensor module unit 720 can be configured such that channels of data associated with a second subset of sensors, including pulse sensors 722-2 to 722-4, air quality sensor 722-6 and light sensor 722-8 are deactivated. This example can represent a scenario where the part of the monitored location at which wireless node 700 is installed has only one measurable utility consumption (e.g., water) that requires monitoring along with a need for temperature and humidity sensor readings.

Since channels of data associated with pulse sensors 722-2 to 722-4, air quality sensor 722-6 and light sensor 722-8 have been deactivated, controller 721 would report to controller 710 that controller 721 has only three data values for retrieval. These three data values are represented by the sensor channels 730-1, 730-4 and 730-7 that are passed between controller 721 in sensor module unit 720 to controller 710 in wireless node 700 over the universal sensor interface. As this example illustrates, the configuration of the activated/deactivated sensor channels of data enables customization to meet the particular needs of a particular part of a monitored location.

As noted, the wireless node can be coupled to a plurality of sensor module units. Different subsets of sensor channels of data in each sensor module unit can be activated/deactivated as needed. In combination, a customized set of sensor channels of data across the plurality of sensor module units can be activated/deactivated as needed.

Figure 8:
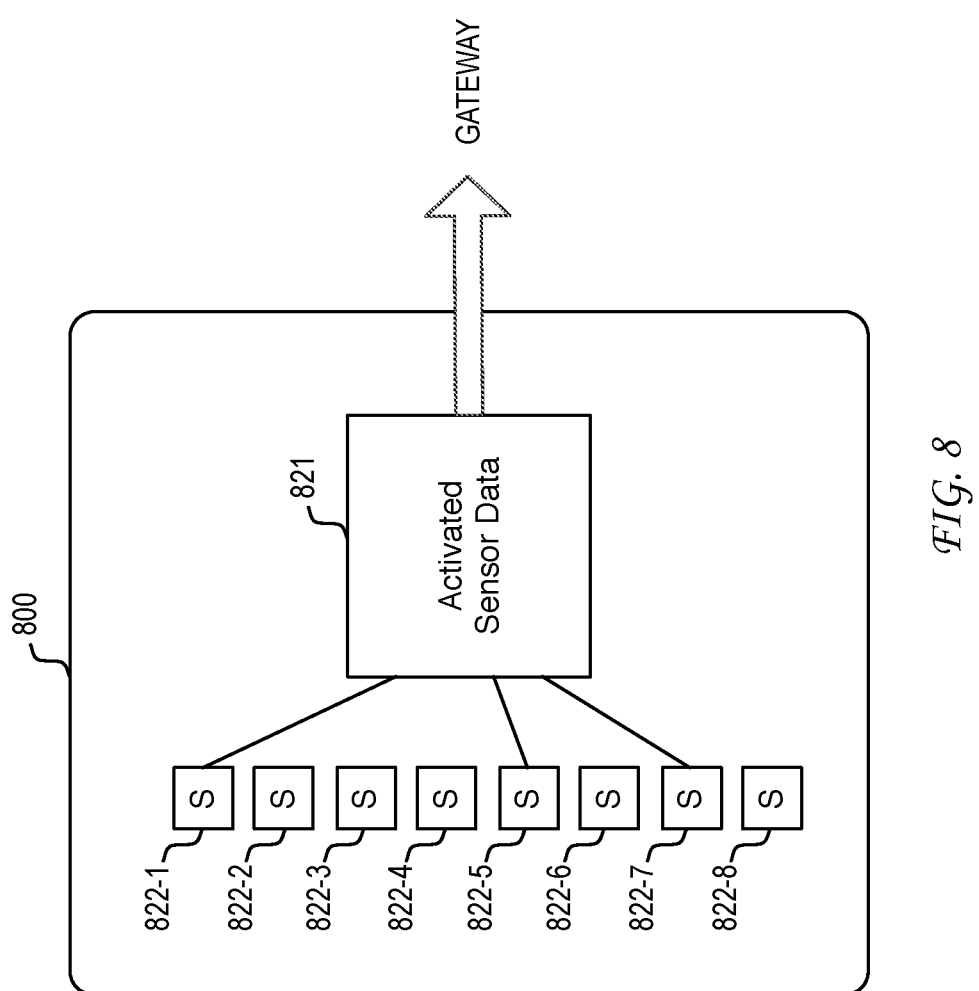
FIG. 8 illustrates a framework of the relative activation of sensors in the wireless sensor network.

Here, it should be noted that the relative activation of sensor channels of data in the wireless sensor network can be accomplished in a variety of ways. FIG. 8 illustrates a framework of the relative activation of sensor channels of data in the wireless sensor network. In this illustration, wireless sensor node unit 800 can represent a combination of a sensor module unit and a wireless node. In a manner similar to FIG. 7, example wireless sensor node unit 800 is illustrated as containing eight sensors 822-1 to 822-8. In a configured mode of operation of wireless sensor node unit 800, channels of data associated with a first subset of sensors is activated and channels of data associated with a second subset of sensors is deactivated or managed in a manner different from channels of data associated with the first subset of sensors. The first subset of sensors, which includes sensor 822-1, sensor 822-5 and sensor 822-7, produces activated sensor data 821. Activated sensor data 821 is transmitted to a gateway device via a wireless transceiver.

The selective transmission of activated sensor data 821 to a gateway device is characteristic of the configured mode of operation of wireless sensor node unit 800. The configured mode of operation can be effected in a number of different ways.

In one embodiment, the configured mode of operation can be effected such that the second subset of sensors do not perform any sensor measurements. In this embodiment, one or more components associated with the second subset of sensors can enter an unpowered or other energy saving state such that power consumption is minimized. In general, maximizing power savings by powering down any unneeded component would maximize the lifetime of internal powering solutions (e.g., battery power). This extended lifetime would lower the maintenance costs of the wireless sensor network in delaying action by a service technician (e.g., replacing an internal battery).

In another embodiment, the configured mode of operation can be effected such that a controller in the sensor module unit is prevented from collecting or otherwise retrieving data from the second subset of sensors. In one example, the one or more of the second subset of sensors can remain powered, but the controller in the sensor module unit does not collect or otherwise retrieve data from the second subset of sensors. In one scenario, the interface between the controller and a sensor in the second subset of sensors can be deactivated. FIG. 7 provides an illustration of this scenario, where the interfaces between controller 721 and sensor 722-2, sensor 722-3, sensor 722-4, sensor 722-6 and sensor 722-8 are deactivated.

In another embodiment, the configured mode of operation can be effected such that a controller in the sensor module unit has obtained sensor data from the second subset of sensors, but does not forward the obtained sensor data to the wireless node via the wired interface. In one example, the second subset of sensors can continue to take sensor measurements and forward those sensor measurements to the controller in the sensor module unit. The controller can then be configured to forward only the sensor measurements from the first subset of activated sensors to the wireless node.

In yet another embodiment, the configured mode of operation can be effected such that the controller in the wireless node has obtained sensor data from the second subset of sensors, but does not forward the obtained sensor data to the gateway via the wireless transceiver. In one example, the sensor module unit can continue to take sensor measurements and forward those sensor measurements to the controller in the wireless node. The controller can then be configured to forward only the sensor measurements from the first subset of activated sensors to the gateway. This embodiment is useful where wireless bandwidth in the wireless sensor network is of concern. Effectively, the controller in the wireless node can be configured to filter the sensor channels that are transmitted to the gateway.

As has been illustrated, the configured mode of operation of the wireless sensor node unit can limit the transmission of sensor data to the gateway in a variety of ways. In various examples, the limitation effected by the configured mode of operation can influence the operation of the sensors, the operation of the interface between the sensor and the controller in the sensor module unit, the operation of the controller in the sensor module unit, the operation of the universal sensor interface, the operation of the controller in the wireless node, the operation of the wireless transceiver, or the operation of any other component in the sensor data path. The particular mechanism used by the configured mode of operation would be implementation dependent. In general, the configured mode of operation can be designed to limit the collection and/or forwarding of data in the data path originating at the second subset of sensors.

Figure 9:
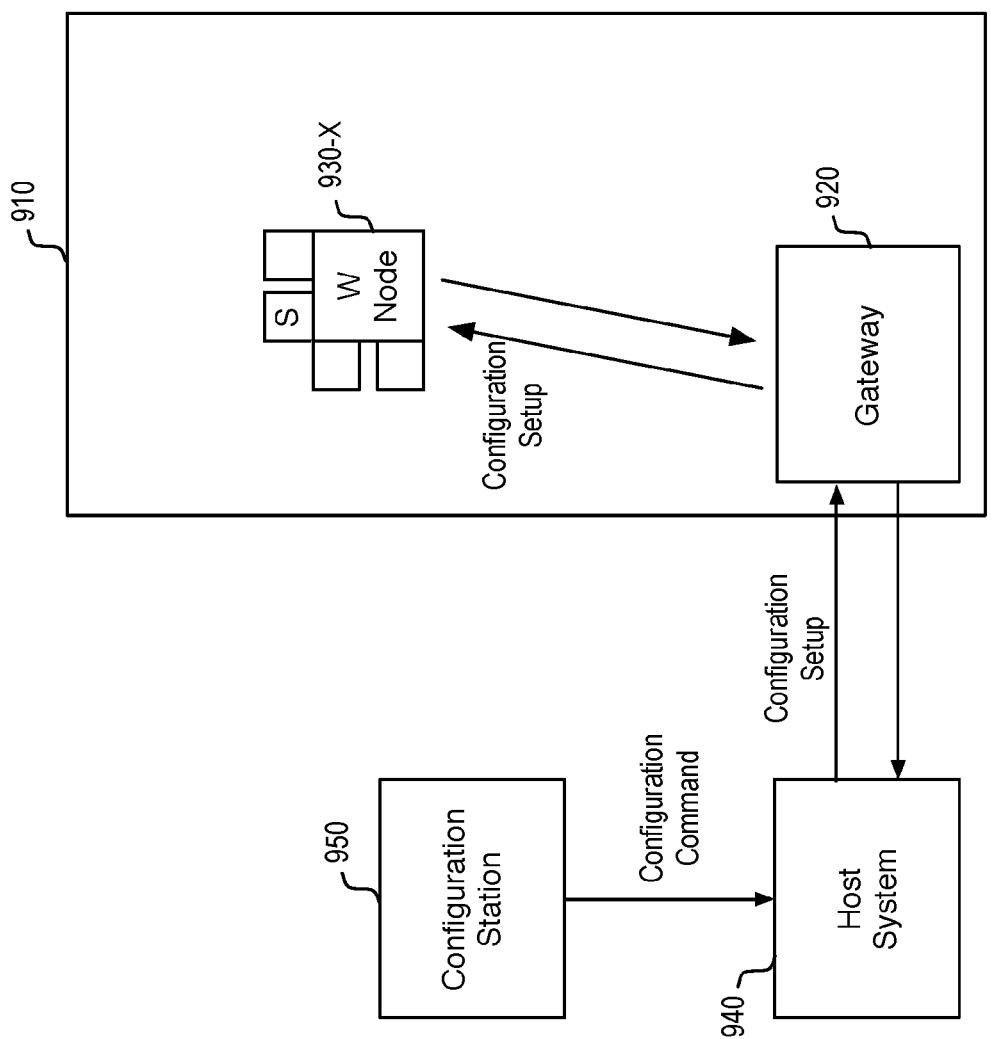
FIG. 9 illustrates a framework for enabling remote configuration of the operation of a wireless sensor network.

FIG. 9 illustrates a framework for enabling remote configuration of the operation of the wireless sensor network at the monitored location. As illustrated, host system 940 can support configuration station 950 (e.g., personal computer, tablet, mobile phone, or other computing device). In one embodiment, host system 940 provides configuration station 950 with computer readable program code that enables configuration station 950 to render a user interface (e.g., web interface). The user interface enables a user at configuration station 950 to identify a configured mode of operation for the wireless sensor network. Through the interaction by a user with the user interface presented at configuration station 950, configuration station 950 can generate a configuration command that is transmitted to host system 940. In general, the generated configuration command can be designed to produce one or more actions that influence or otherwise modify the operation of the wireless sensor network.

In the illustrated example, the configuration command is received by host system 940 and used as the basis for generating configuration setup information that is subsequently transmitted to one or more wireless nodes such as wireless node 930-X. In the general sense, configuration setup information can be used to influence or otherwise modify the operation of any element in an upstream or downstream path between host system 940 and a sensor module unit attached to a wireless node. For example, the generated configuration setup information can be used to influence or otherwise modify the operation of a component within host system 940, gateway 920, wireless node 930-X, and/or a sensor module unit attached to wireless node 930-X.

By this process, configuration station 950 can be used to effect remote configuration of the wireless sensor network. It is a feature of the present disclosure that the remote configuration provides further flexibility in enabling post-installment configuration. Features and capabilities of the wireless sensor network would therefore not be constrained to pre-installed features. Rather, features in the wireless sensor network can be dynamically added or modified after the installation of a base of modular components. Installation and configuration costs of the wireless sensor network are therefore minimized.

Figure 10:
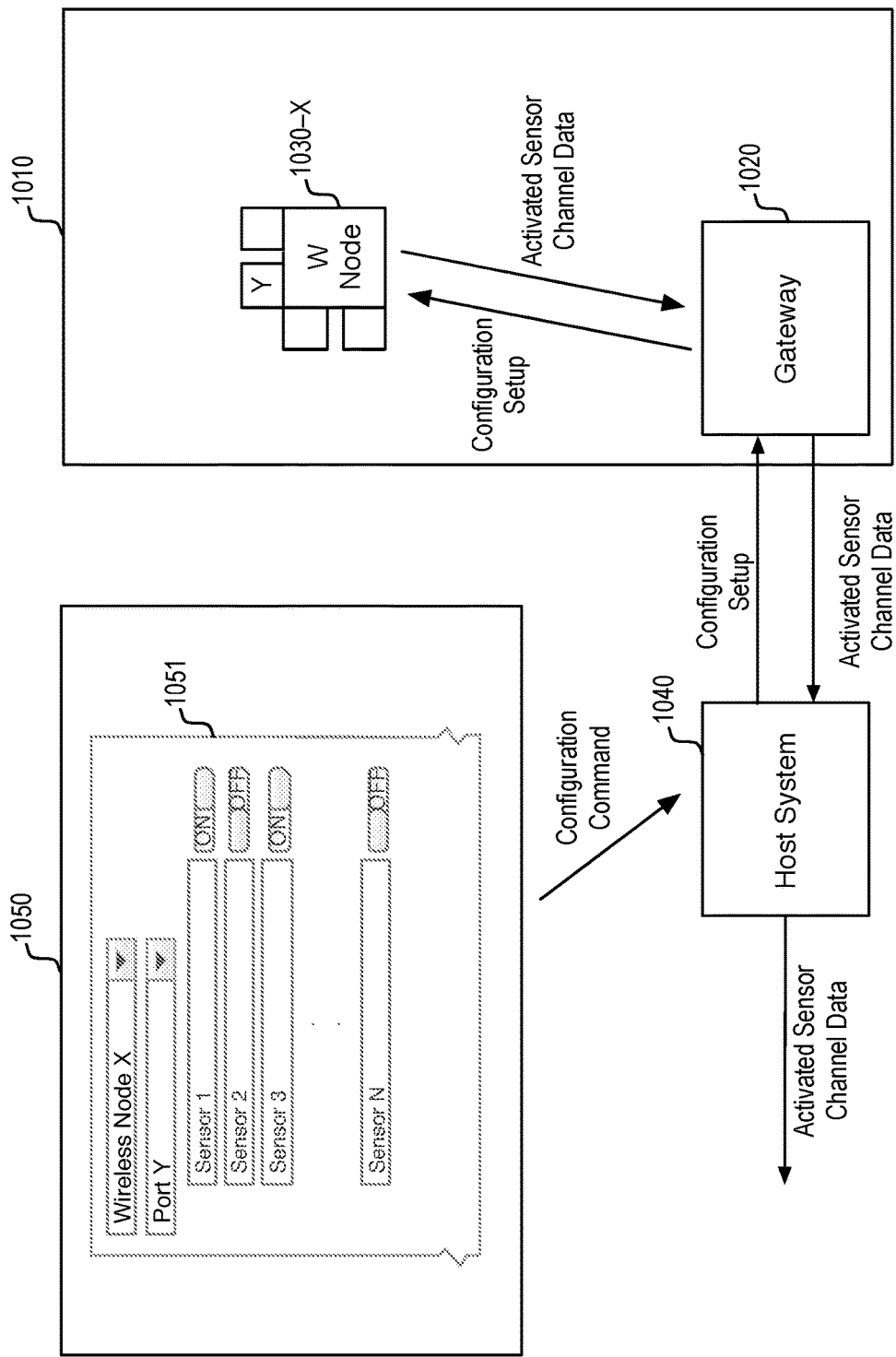
FIG. 10 illustrates an example embodiment of remote configuration for activation of sensor channels of data.

FIG. 10 illustrates an example embodiment of the use of remote configuration for activation of sensor channels of data. As illustrated, configuration station 1050 supports the provision of a user interface 1051 that enables a user to activate/deactivate particular sensor channels of data at monitored location 1010. In one example, a settings module supported by host system 1040 can transmit computer readable program code from a server device to configuration station 1050 that enables configuration station 1050 to render user interface 1051. Through the interaction by the user with user interface 1051 on configuration station 1050, the user can specify the details of particular sensor channels of data that should be activated/deactivated. As noted, this activation/deactivation of sensor channels of data would effect a change in the collection and/or reporting of sensor channels of data by a sensor module unit, a wireless node, a gateway, and/or a host system.

User interface 1051 enables a user to specify a particular wireless node. In various embodiments, the wireless node can be specified using a wireless node ID, a pseudo-name for the wireless node, or any other mechanism that enables individual identification of a wireless node. The specification of a particular wireless node can also be facilitated by a grouping of deployed wireless nodes per monitored location. In the illustrated example of FIG. 10, the identification of "Wireless Node X" would correspond to wireless node 1030-X at monitored location 1010.

After identification of wireless node 1030-X, user interface 1051 would then enable the user to identify a particular port of wireless node 1030-X. For example, where wireless node 1030-X includes four ports that expose interface connectors for physical attachment to a connector on a sensor module unit, user interface 1051 would enable selection of one of the four ports. In the illustrated example of FIG. 10, the identification of "Port Y" would correspond to the sensor module unit attached to port Y of wireless node 1030-X at monitored location 1010.

Next, user interface 1051 would enable the user to specify, for each included sensor in the sensor module unit attached to port Y of wireless node 1030-X, whether that sensor channel of data is activated or deactivated. In the illustrated example of FIG. 10, the user has activated the channel of data associated with Sensor 1, deactivated the channel of data associated with Sensor 2, activated the channel of data associated with Sensor 3, . . . , and deactivated the channel of data associated with Sensor N.

Through the interaction by a user with user interface 1051, an activation/deactivation status of each sensor channel of data in the sensor module unit attached to port Y of wireless node 1030-X would be specified. The specification of the activation/deactivation status of each sensor channel of data can then be returned as a configuration command to host system 1040. In one embodiment, host system 1040 can store an activation/deactivation status for each sensor channel of data in a database based on the received configuration command. In one example, the activation/deactivation status for a sensor channel of data is stored in accordance with an identifier based on a gateway identifier, a wireless node identifier, a port identifier and a sensor identifier.

Based on the remotely-configured activation/deactivation status, host system 1040 can then generate configuration setup information for the configuration of the sensor channels of data in the sensor module unit attached to port Y of wireless node 1030-X at monitored location 1010. In one embodiment, host system 1040 would transmit the generated configuration setup information to wireless node 1030-X via gateway 1020. The configuration setup information can then be used by wireless node 1030-X in configuring the operation of the sensor module unit attached to port Y and/or the operation of wireless node 1030-X. After configuration, wireless node 1030-X would transmit activated sensor channels of data back to host system 1040 for sub sequent distribution.

As noted above, the activation/deactivation of individual sensor channels of data can effectively be performed at different parts of the sensor module unit and/or wireless node. The particular mechanism by which the configuration setup information would be used would therefore be implementation dependent. For example, the configuration setup information can be used to influence the operation of the sensors, the operation of the interface between the sensor and the controller in the sensor module unit, the operation of the controller in the sensor module unit, the operation of the universal sensor interface, the operation of the controller in the wireless node, the operation of the wireless transceiver, or the operation of any other component in the sensor data path.

In one embodiment, the configuration setup information would not produce a change in the transmissions by wireless node 1030-X, which can forward sensor channels of data from all sensors. In this example, the configuration setup information can be used by gateway 1020 and/or host system 1040 to influence the operation of gateway 1020 and/or host system 1040 in forwarding only a select set of sensor channels of data that have been activated. This selective transmission of sensor channels of data can support a billing model where customers pay per sensor channel stream of data that is exposed by the host system to the customer.

As has been described, user interface 1051 on configuration station 1050 enables a user to remotely configure an activation/deactivation status for every sensor channel of data associated with every sensor in every sensor module unit attached to every wireless node at the monitored location. Here, the activation/deactivation status specified at configuration station 1050 produces a change in the collection and/or processing of sensor channels of data that are performed by one or more of a sensor module unit, a wireless node, a gateway, and a host system. This change in the collection and/or processing of sensor channels of data at units remote from configuration station 1050 enables a scalable wireless sensor network solution that reduces installation and maintenance costs as the wireless sensor network evolves to address changing sensor application needs at a particular monitored location.

The activation/deactivation status specified at a configuration station can be performed as part of a dynamic reconfiguration process. There is no limit to the frequency of such changes in the activation/deactivation status. Rather, the frequency of such changes (e.g., daily, weekly, monthly, or any other frequency) is dictated by the changing sensor application objectives at the monitored location. These changes are dynamic. For example, where a customer is billed on a per sensor channel of data basis and on a per unit time basis (e.g., hourly, daily, monthly, or other specified time period), a customer can activate and deactivate a sensor channel of data to only the times that it is needed to minimize the cost of such monitoring. In this example, the customer can configure the utilization of a sensor service as it relates to the activation/deactivation of a particular sensor channel of data. In one example, the sensor service can represent an on-demand application that a customer can turn on/off based on customer needs. The granularity provided by the dynamic reconfiguration process would therefore enable a customer to have the usage of the sensor service scale in a manner that fits within their unique utility vs. cost framework.

In the present disclosure, it is recognized that wireless sensor network administrators benefit from system status tools that enable them to specify and confirm the current configuration of the wireless sensor network. The importance of this specification and confirmation of the operational status of the wireless sensor network grows as the flexibility in the configuration and reconfiguration of the wireless sensor network increases.

Figure 11:
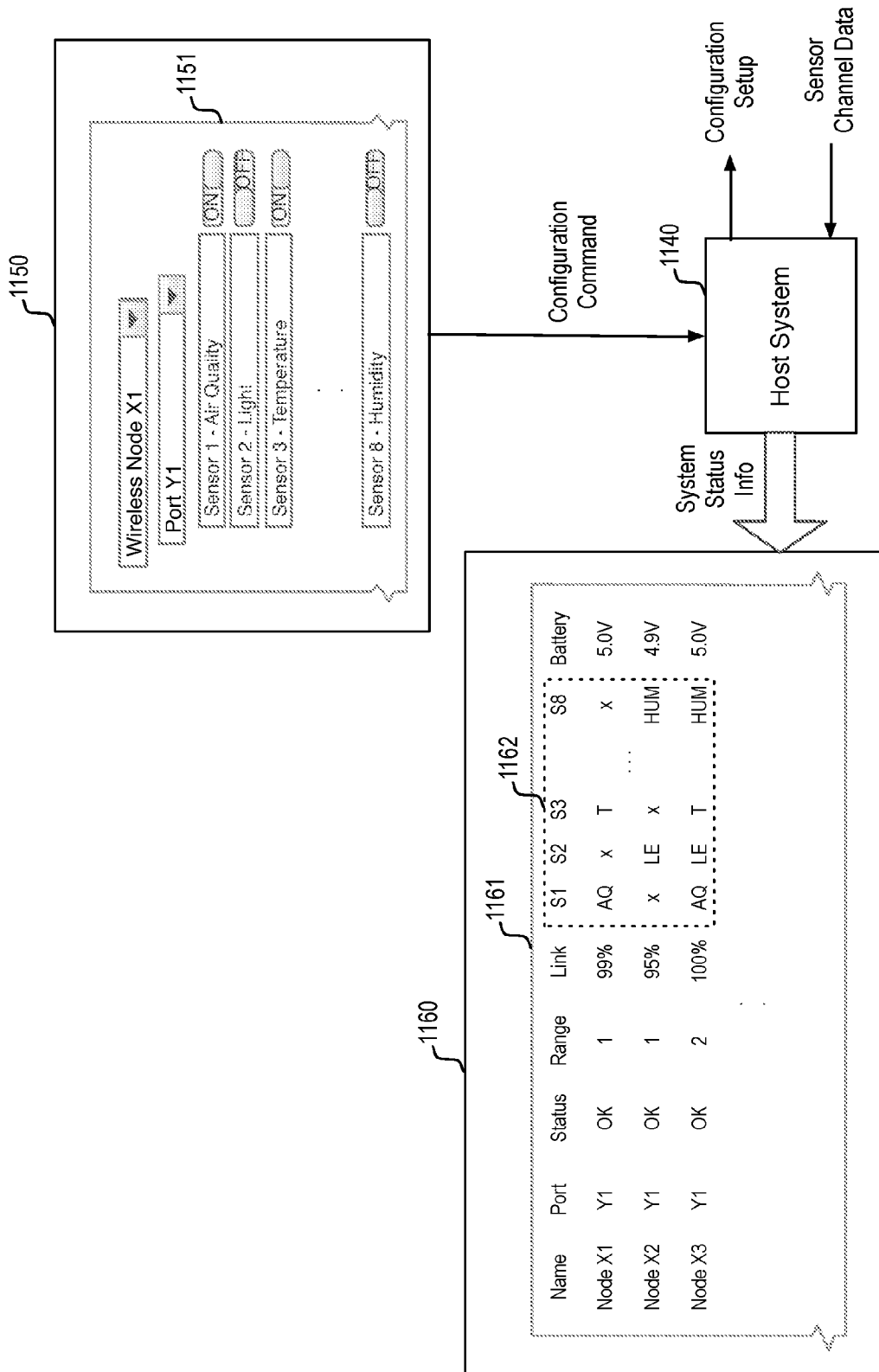
FIG. 11 illustrates an example embodiment of a system status feature.

FIG. 11 illustrates an example embodiment of a system status feature of the present disclosure that facilitates such monitoring and confirmation. In one embodiment, host system 1140 can include a settings module that can transmit computer readable program code from a server device to configuration station 1150 that enables configuration station 1150 to render user interface 1151. In a manner similar to that described with reference to FIG. 10, user interface 1151 enables a user to activate/deactivate particular sensor channels of data at a monitored location.

In response to the interaction by a user with user interface 1151, configuration station 1150 would transmit a configuration command to host system 1140. Based on the received configuration command, host system 1140 can generate configuration setup information for the configuration of the activation/deactivation of sensor channels of data produced at a monitored location.

In one embodiment, host system 1140 can include a system status module that can transmit computer readable program code from a server device to system status station 1160 (e.g., personal computer, tablet, mobile phone, or other computing device) that enables system status station 1160 to render user interface 1161. In one embodiment, user interface 1161 enables a user to view the status of various wireless sensor network components to confirm that the current configuration of the wireless sensor network matches the desired configuration. If the current configuration of the wireless sensor network does not match the desired configuration, then the sensor application objectives at the monitored location would be unable to be achieved.

In the example of FIG. 11, a status of the various sensor channels of data in the wireless sensor network at the monitored location is provided via rows in a table rendered in user interface 1161. In the illustrated example, each row of the table can display columns of information such as a Name, Port, Status, Range, Link Quality, Sensor Status, and Battery Level. Here, the Name column can refer to a wireless node identifier, the Port column can refer to the particular port of the wireless node to which a sensor module unit is attached, the Status column can refer to an operational status of the wireless node, the Range column can refer to a number of links between the wireless node and a gateway, the Link column can refer to a signal quality measure between the wireless node and the gateway or other wireless node, and the Battery column can refer to a battery voltage level of the wireless node. Also included in user interface 1161 is section 1162, which includes separate Sensor Status columns for each of the sensor channels of data supported by the sensors in a sensor module unit. In this example illustration, it is assumed that each sensor module unit affixed to a port of a wireless node can support up to eight sensors. Thus, section 1162 in user interface 1161 can include eight separate Sensor Status columns for each of the eight sensor channels of data produced by the sensors in a sensor module unit. Section 1162 in user interface 1161 can be used to reflect the evolution of the wireless sensor network at the monitored location, wherein knowledge of the current status of sensor channels of data is needed.

As noted above with respect to FIG. 10, a settings module in a host system can be used to activate/deactivate individual sensor channels of data. As illustrated in user interface 1151, a user can specify the activation/deactivation of the sensor channels of data supported by the sensors in the sensor module unit attached to Port Y1 of wireless node X1. As illustrated, the channel of data associated with Sensor 1 (Air Quality) is activated, the channel of data associated with Sensor 2 (Light) is deactivated, the channel of data associated with Sensor 3 (Temperature) is activated, . . . , and the channel of data associated with Sensor 8 (Humidity) is deactivated. Based on this user specification, configuration setup information can be transmitted by host system 1140 to the wireless sensor network at the monitored location.

After activation/deactivation of the appropriate sensor channels of data, host system 1140 can receive and distribute sensor channels of data as needed. Host system 1140 can also receive status information (e.g., link range, link quality, battery level) that host system 1140 can provide to system status station 1160 via a system status module. As part of this status information, host system 1140 can also confirm that sensor channel information has been received and forwarded for activated sensor channels of data, and whether sensor channel information has not been received or forwarded for deactivated sensor channels of data. The status information is used by host system 1140 to generate the information displayed in user interface 1161.

As illustrated, section 1162 of user interface 1161 can provide status information about the individual sensor channels of data supported by the sensors in the various sensor module units at the monitored location. As an example, the row for Node X1 would indicate in section 1162 that the channel of data associated with Sensor 1 (Air Quality) is activated, the channel of data associated with Sensor 2 (Light) is deactivated, the channel of data associated with Sensor 3 (Temperature) is activated, . . . , and the channel of data associated with Sensor 8 (Humidity) is deactivated. As this row displays, the relative activation/deactivation status for the channels of data associated with the eight sensors contained in the sensor module unit attached to Port Y1 of Wireless Node X1 is consistent with the configuration specification shown in user interface 1151 of configuration station 1150.

To further confirm that the wireless sensor network is configured as desired, user interface section 1162 can also enable a user to gain further detailed information related to a particular sensor channels of data. For example, if a user selects the "T" user interface element in the S3 column of Node X1, the user can then be provided with further detailed information regarding that sensor channel of data.

Figure 12:
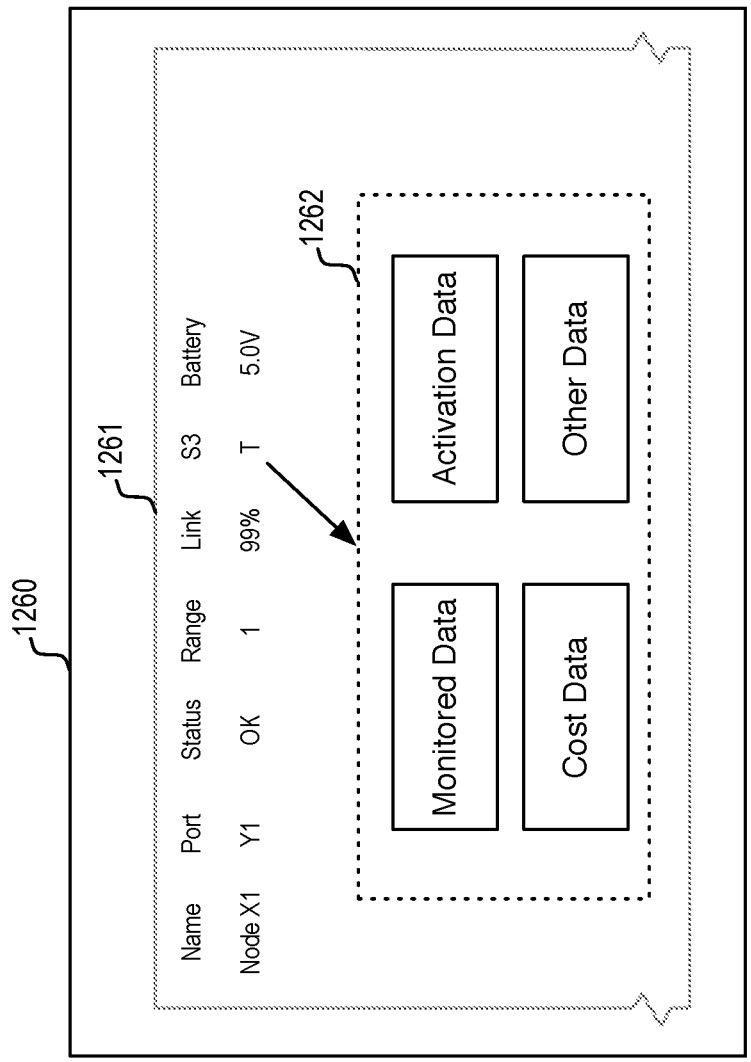
FIG. 12 illustrates an example embodiment of detailed status information provided for a sensor channel of data.

FIG. 12 illustrates an example embodiment of detailed status information that can be provided for a sensor channel of data. As illustrated, system status station 1260 can render user interface 1261. Upon selection of the "T" user interface element in the S3 column of Node X1, user interface section 1262 can be produced that provides further detailed information regarding that sensor channel of data.

In one example, the user can be provided with detailed monitored data (e.g., graph) of the history of the monitored temperature for that particular sensor channel of data. That historical data can be scaled to an appropriate time frame (e.g., hour, day, week, month, year, or other time scale factor) to verify an operation status of that sensor channel of data. By this tool, a user can be made aware whether or not a particular sensor channel of data that is supposedly activated is actually producing the desired data to meet a sensor application objective. In another example, the user can be provided with detailed activation data that can provide the user with a history of the relative activation and deactivation events. In one scenario, the start and duration of activation and deactivation periods for that sensor channel of data can be provided along with a cumulative measure of the relative periods of activation and deactivation. In another example, the user can be provided with detailed cost data that can provide the user with a history of the cost incurred for the periods of activation of the sensor channel of data. In one scenario, the costs of the sensor service for that sensor channel of data can be broken down into an appropriate time frame (e.g., hour, day, week, month, year, or other time scale factor) to verify the value proposition of the sensor service. As would be appreciated, user interface section 1262 can also include any other data that can be used to confirm the operational status, history, effectiveness, or other utility measure as needed.

As has been described, the system status information provided enables an administrator to confirm the configuration or reconfiguration of the wireless sensor network. Without such a system status tool, setup and maintenance costs can increase as maintenance personnel would require on-site inspection and analysis to confirm a desired configuration or reconfiguration of the wireless sensor network. These increased costs would limit the flexibility and application of the wireless sensor network. Additionally, the system status information supports the provision of a sensor service, which enables customers to selectively activate/deactivate sensor channels of data and evaluate the effectiveness of the sensor service.

Another embodiment of the present disclosure can provide a machine and/or computer readable storage and/or medium, having stored thereon, a machine code and/or a computer program having at least one code section executable by a machine and/or a computer, thereby causing the machine and/or computer to perform the steps as described herein.

Those of skill in the relevant art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Those of skill in the relevant art can implement the described functionality in varying ways for each particular application. Various components and blocks may be arranged differently (e.g., arranged in a different order, or partitioned in a different way) all without departing from the scope of the subject technology.

These and other aspects of the present disclosure will become apparent to those skilled in the relevant art by a review of the preceding detailed disclosure. Although a number of salient features of the present disclosure have been described above, the principles in the present disclosure are capable of other embodiments and of being practiced and carried out in various ways that would be apparent to one of skill in the relevant art after reading the present disclosure, therefore the above disclosure should not be considered to be exclusive of these other embodiments. Also, it is to be understood that the phraseology and terminology employed herein are for the purposes of description and should not be regarded as limiting.

What is claimed is:

1. A method, comprising:
receiving, at a host system that is remote from a monitored location, a configuration command based on a first user instruction associated with a first subset of a plurality of sensor channels of data, the first subset of the plurality of sensor channels of data carrying sensor data generated by a first subset of a plurality of sensors contained in a first of a plurality of sensor nodes at the monitored location, wherein each of the plurality of sensor nodes communicate with a gateway device at the monitored location, the gateway device having a wide area network connection to the host system;

transmitting, by the host system in response to the configuration command, configuration setup information to the gateway device for delivery to the first of the plurality of sensor nodes, the configuration setup information enabling the first of the plurality of sensor nodes to activate the first subset of the plurality of sensor channels of data; and transmitting, by the host system in response to a request that identifies the first of the plurality of sensor nodes, system status information that enables a display of a plurality of user interface elements corresponding to the plurality of sensors, wherein a first subset of the plurality of user interface elements provides an indication of a first activation activity determined from the first user instruction, the first activation activity indicating that the first subset of the plurality of sensor channels of data is configured to deliver sensor data generated by the first subset of the plurality of sensors contained in the first of the plurality of sensor nodes to the gateway device, and a second subset of the plurality of user interface elements provides an indication of a second activation activity determined from a second user instruction different from the first user instruction.

2. The method of claim 1, wherein the monitored location is a building.

3. The method of claim 1, wherein the monitored location is a movable area of control.

4. The method of claim 1, wherein the first subset of the plurality of user interface elements includes a description of a type of sensor channel of data that has been activated.

5. The method of claim 1, wherein the plurality of sensors are contained in a sensor module unit attached to a wireless node.

6. The method of claim 1, further comprising transmitting, by the host system, a history of activation activity for the first subset of the plurality of sensor channels of data.

7. The method of claim 1, wherein the indication of the first activation activity and the indication of the second activation activity provide an activated status.

8. The method of claim 1, wherein the indication of the second activation activity provides a deactivated status.

9. A method, comprising:

receiving, at a host system, activation information for a sensor channel of data associated with a sensor installed at a monitored location, the activation information triggering an activation state for the sensor channel of data applicable to a first time period;

transmitting, by the host system during the activation state, sensor information based on the sensor channel of data to a destination during the first time period;

receiving, at the host system, deactivation information for the sensor channel of data, the deactivation information triggering a deactivation state for the sensor channel of data applicable to a second time period different from the first time period;

restricting, by the host system during the deactivation state, a transmission of sensor information based on the sensor channel of data to the destination during the second time period; and transmitting, by the host system, cost information to a client device, the cost information providing an indication of a cost of delivering the sensor information to the destination for one or more activation states during a defined period of time that includes the first time period.

10. The method of claim 9, wherein the monitored location is a building.

11. The method of claim 9, wherein the monitored location is a movable area of control.

12. The method of claim 9, further comprising transmitting, by the host system, a history of activation state events and deactivation state events.

13. The method of claim 9, wherein the defined period of time is a year.

14. A system, comprising:

a configuration server device configured to receive a configuration command based on a first user instruction associated with a first subset of a plurality of sensor channels of data, the first subset of the plurality of sensor channels of data carrying sensor data generated by a first subset of a plurality of sensors contained in a first of a plurality of sensor nodes installed at a monitored location, the configuration command enabling the configuration server device to generate configuration setup information for remote configuration of the first subset of the plurality of sensor channels of data, the configuration setup information enabling the first of the plurality of sensor nodes to activate the first subset of the plurality of sensor channels of data for delivery of sensor data generated by the first subset of the plurality of sensors to the host system via the gateway device, wherein each of the plurality of sensor nodes communicate with a gateway device at the monitored location, the gateway device having a wide area network connection to a host system; and a web server device configured to transmit, in response to a request that identifies the first of the plurality of sensor nodes, system status information that enables a display of a plurality of user interface elements corresponding to the plurality of sensors, wherein a first subset of the plurality of user interface elements corresponding to the first subset of the plurality of sensor channels of data provides an indication of a first activation activity for the first subset of the plurality of sensor channels of data as determined from the first user instruction, and a second subset of the plurality of user interface elements corresponding to a second subset of the plurality of sensor channels of data provides an indication of a second activation activity for a second subset of the plurality of sensor channels of data as determined from a second user instruction different from the first user instruction.

15. The system of claim 14, wherein the monitored location is a building.

16. The system of claim 14, wherein the monitored location is a movable area of control.

17. The system of claim 14, wherein the first subset of the plurality of user interface elements includes a description of a type of sensor channel of data that has been activated.

18. The system of claim 14, wherein the web server device is further configured to transmit a history of activation activity for the first subset of the plurality of sensor channels of data.

19. The system of claim 14, wherein the indication of the first activation activity and the indication of the second activation activity provide an activated status.

20. The system of claim 14, wherein the indication of the first activation activity provides an activated status and the indication of the second activation activity provides a deactivated status.

* * * * *